Patented July 29, 1924.

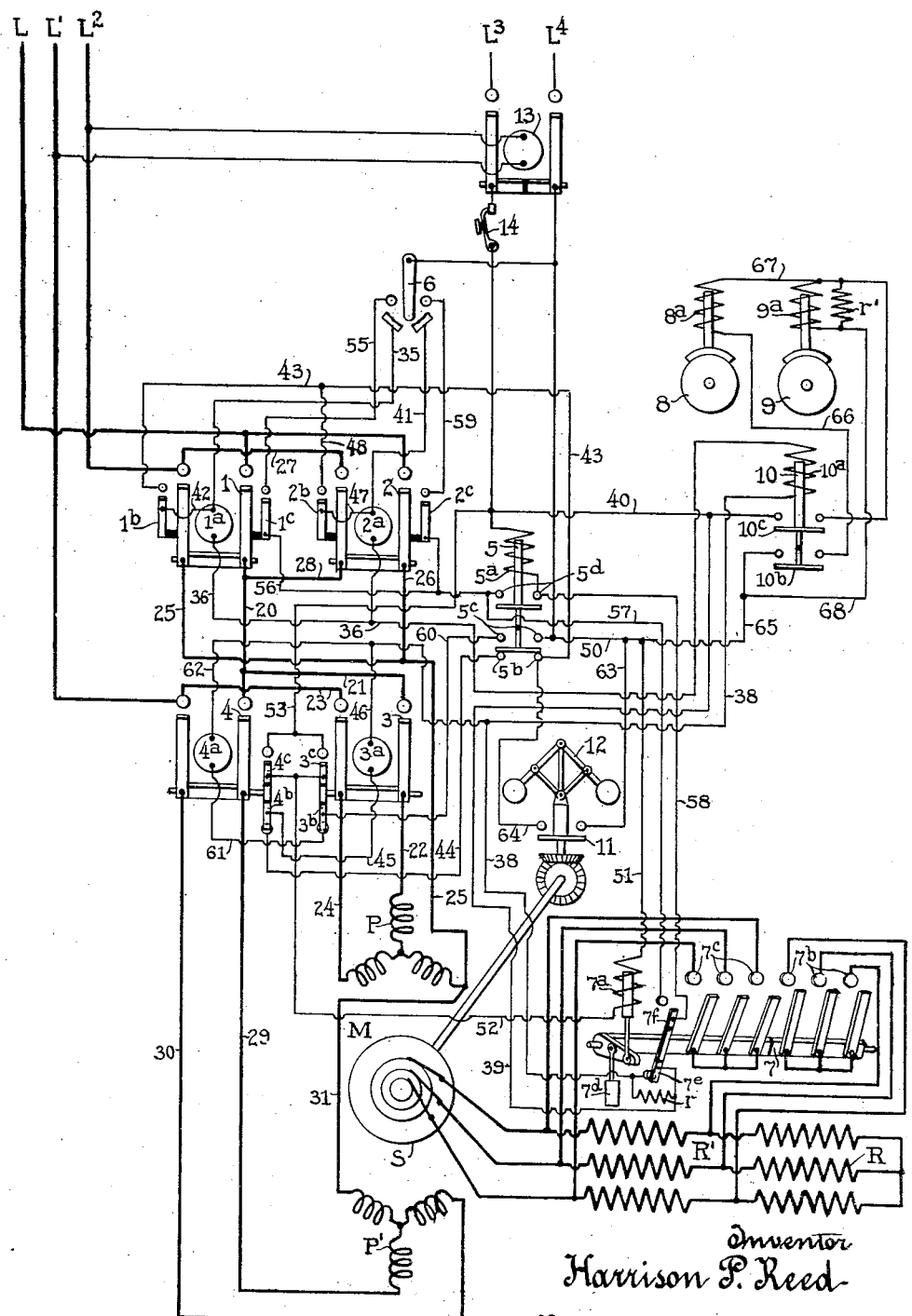

1,503,245

UNITED STATES PATENT OFFICE.

HARRISON P. REED, OF MILWAUKEE, WISCONSIN, ASSIGNOR TO THE CUTLER-HAMMER MFG. CO., OF MILWAUKEE, WISCONSIN, A CORPORATION OF WISCONSIN.

MOTOR CONTROLLER.

Application filed March 23, 1917. Serial No. 156,830.

*To all whom it may concern:*

Be it known that I, HARRISON P. REED, a citizen of the United States, residing at Milwaukee, in the county of Milwaukee and State of Wisconsin, have invented new and useful Improvements in Motor Controllers, of which the following is a full, clear, concise, and exact description, reference being had to the accompanying drawing, forming a part of this specification.

This invention relates to motor controllers.

It has been proposed to employ for elevator service an alternating current motor having a single secondary winding and two primary windings, the latter to be connected in circuit alternatively for operation of the motor at different speeds and this invention has among its objects to provide an efficient and reliable controller for such a motor.

A further object is to provide a controller for effecting gradual acceleration of such a motor by regulation of its secondary circuit upon line connection of each of its primary windings and for insuring against line connection of one of said primary windings until after the motor has been started by the other of said windings and accelerated by regulation of its secondary circuit.

A further object is to provide a controller for effecting self braking of such a motor under certain conditions and for insuring against defeat of such braking action by the means provided for stopping of the motor under ordinary conditions.

Various other objects and advantages of the invention will hereinafter appear.

The accompanying drawing diagrammatically illustrates one embodiment of the invention which will now be described, it being understood that the invention may be embodied in other forms falling within the scope of the appended claims, and that certain features of the invention are applicable to other types of motors.

The drawing illustrates a motor M of the type above mentioned, said motor having primary windings P and P' and a slip ring secondary S. The primary winding P when energized provides for relatively slow speed operation of the motor while the winding P' when energized provides for relatively high speed operation of the motor. Both primary windings are three phase and it may be assumed that the former has 24 poles and the latter 8 poles, said windings to be connected selectively to a three phase source of current L, L', L².

The controller illustrated, which is particularly adapted for elevator service, includes electromagnetic reversing switches 1 and 2 common to the circuits of both primary windings, an electromagnetic switch 3 controlling the continuity of circuit of primary winding P, an electromagnetic switch 4 controlling the continuity of circuit of winding P', an electro-responsive relay 5 controlling switches 3 and 4 and a master switch 6 controlling switches 1 to 4 but subject to the action of relay 5 with respect to switches 3 and 4. Also, the controller includes an electromagnetic accelerating device 7 controlling sets of resistances R, R', in the slip ring circuit of the motor, electromagnetically controlled brakes 8 and 9, the former for the winding drum and the latter for the motor, an electro-responsive brake relay 10 for controlling the windings of said brakes and a switch 11 operable by a fly ball governor 12 driven by the motor, said switch 11 providing for self braking action of the motor, as hereinafter set forth. The windings of the aforesaid switches and devices are shown as supplied with current from a direct current source L³, L⁴, although they might, if desired, be supplied from the alternating current source and said D. C. source is shown as controlled by a relay 13 dependent for energization upon the alternating current source. Also, a manual switch 14 is provided for interrupting the direct current circuit in emergencies, the same constituting what is ordinarily termed the "car safety switch."

Briefly describing the operation and functions of the controller without detailing the circuits, movement of the master switch 6 to the left energizes switch 1 and brake relay 10. Switch 1 is assumed to be the "up" switch and upon responding energizes switch 3 to connect in circuit the slow speed primary winding P, but on condition that all resistance is included in the slip ring circuit of the motor by the device 7. Switch 3 in closing also energizes the device 7 to progressively exclude the resistances R and R' from the slip ring circuit for gradual acceleration of the motor to the normal speed provided for by winding P. Also, device 7 thereupon energizes relay 5 assuming prior movement of the master switch to its second left hand position and said relay in responding de-energizes switch 3 and the device 7, and furthermore energizes switch 4 but subject to return movement of the device 7 to reinclude the resistances R and R' in the slip ring circuit of the motor. Then switch 4 in responding connects in circuit the high speed primary winding P', and furthermore re-energizes the device 7 to again exclude from the slip ring circuit the resistances R and R' for gradual acceleration of the motor to the normal speed provided for by said winding P'. On the other hand, assuming movement of the master switch to the right it first energizes switch 2, assumed to be the "down" switch, and thereupon effects the same sequence of operation of the other switches for acceleration of the motor, said switch 2 serving to reverse certain of the power connections of the primary windings for reverse operation of the motor. Thus the controller provides for gradual acceleration of the motor by regulation of its secondary circuit following energization of each of its primary windings and positively insures against energization of the high speed winding P' until after the motor has been started by the slow speed winding P and duly accelerated and until the resistance has been reinserted in the secondary circuit.

With the motor in operation at high speed in either direction it may be slowed down by return movement of the master switch to de-energize relay 5 and thereby de-energize switch 4 and re-energize switch 3; but subject to release of device 7 by switch 4 and full return movement of said device. Then if it be desired to stop the motor the master switch may be moved to "off" position to de-energize switch 3 and the preselected reversing switch for interruption of the power circuit. However, the arrangement is such that if the master switch is returned to "off" position while the motor exceeds its slow synchronous speed by a predetermined degree, the switch 11 operated by the fly ball governor serves to shunt the master switch for maintaining the power connections of the slow speed primary winding P, thus effecting self braking of the motor until reduced to a predetermined speed. Thereupon the fly ball governor releases the switch 11 to effect deenergization of the switch 3, the preselected reversing switch and the brake relay 10, thereby disconnecting the motor from circuit and de-energizing the windings of brakes 8 and 9 for setting of said brakes. Also, such self-braking action of the motor is obtainable upon return of the master switch from high speed to slow speed position. Moreover since reclosure of slow speed switch 3 is dependent upon release of device 7 to reinsert all secondary resistance and closure of said switch re-energizes said device, the latter provides for maintaining the braking force of the motor at a high mean value by progressively excluding the secondary resistance as the motor slows down.

All of the switches, relays and other control devices illustrated in the drawing are of well known type but it is desired to refer, at this point, to the following details thereof in order to facilitate explanation of the circuit connections. The switch 1, which is of the double pole clapper type, is provided with auxiliary contacts $1^b$ and $1^c$ insulated therefrom and arranged to complete circuit only when said switch is closed. The switch 2 is identical with switch 1, having auxiliary contacts $2^b$ and $2^c$ corresponding to those of the latter switch. The switch 3, which is also of the double pole clapper type, is provided with auxiliary contacts $3^b$ and $3^c$ insulated therefrom, the former contacts being arranged to complete circuit only in the open position of said switch and the latter contacts to complete circuit only in the closed position of said switch. The switch 4 is identical with switch 3, having auxiliary contacts $4^b$ and $4^c$ corresponding to those of the latter switch. The relay 5 has three sets of contacts $5^b$, $5^c$ and $5^d$, the first set to be bridged when said relay is deenergized and the second and third sets to be bridged when said relay responds. The device 7 is provided with two triple pole sets of contacts $7^b$ and $7^c$ to be engaged progressively, subject to retardation by a dash-pot $7^d$ associated with said device; and also with auxiliary contacts $7^e$ and $7^f$, the former to complete circuit only in "off" position of said device and the latter to complete circuit only upon full operation of said device.

Describing the circuit connections in detail, the motor connections are as follows: Assuming closure of "up" switch 1 and slow speed switch 3, circuit may be traced from line L through the right hand pole of switch 1, by conductors 20 and 21 through the right hand pole of switch 3, by conductor 22 to the middle terminal of primary winding P; from line L' by conductor 23 through the left hand pole of switch 3, by conductor 24 to the left hand terminal of winding P; and from line $L^2$ through the left hand pole of switch 1, by conductor 25 to the right hand terminal of winding P. On the other hand, assuming closure of "down" switch 2 and slow speed switch 3, circuit may be traced from line L through the right hand pole of switch 2, by conductors 26 and 25 to the right hand terminal of winding P; from line L' to the left hand terminal of winding P, as already traced; and from line $L^2$ by conductor 27 through the left hand pole of switch 2, by conductors 28, 20 and 21 through the right hand pole of switch 3 to the middle terminal of winding P. Again assuming closure of "up" switch 1 and high speed switch 4, circuit may be traced from line L through the right hand pole of switch 1, by conductor 20 through the right hand pole of switch 4, by conductor 29 to the middle terminal of primary winding P'; from line L' through the left hand pole of switch 4, by conductor 30 to the right hand terminal of winding P'; and from line L² through the left hand pole of switch 1, by conductors 25 and 31 to the left hand terminal of winding P'. On the other hand, assuming closure of "down" switch 2 and high speed switch 4, circuit may be traced from line L through the right hand pole of switch 2, by conductors 26, 25 and 31 to the left hand terminal of winding P'; from line L' through the left hand pole of switch 4, by conductor 30 to the right hand terminal of winding P'; and from line L³ by conductor 27 through the left hand pole of switch 2, by conductors 28 and 20 through the right hand pole of switch 4, by conductor 29 to the middle terminal of winding P'. The secondary circuit of the motor normally extends through the resistances R and R' in series and upon operation of device 7 is first diverted through the set of contacts 7ᵇ to exclude resistances R and then through the set of contacts 7ᶜ to exclude resistances R', the connections being obvious.

Describing the control circuits, and assuming closure of relay 13 to complete the D. C. circuit, movement of the master switch to its first left hand position completes circuit from line L⁴ to conductor 35 through the operating winding 1ᵃ of switch 1, by conductor 36 through the winding 10ᵃ of the brake relay 10, by conductor 38 through contacts 7ᵉ of the accelerating device, by conductors 39 and 40 to line L³. This provides for energization of switch 1 and the brake relay, the latter upon responding closing circuits for the windings of brakes 8 and 9, to be hereinafter traced. On the other hand, when the master switch is moved to its first right hand position, it closes circuit from line L⁴ to conductor 41, thence through the operating winding 2ᵃ of switch 2 to conductor 36 and thence through the winding of brake relay 10 and through the auxiliary contacts 7ᵉ of device 7 to line L³, which provides for energization of said switch 2 and the brake relay. In this connection it is to be noted that the contacts 7ᵉ of the device 7 serve upon disengagement thereof to insert a resistance r in the circuits just described, said resistance being of such value as to prevent response of the selected reversing switch and brake relay 10, although permitting sufficient current to pass through said circuit to maintain said switch and relay energized after response thereof.

Response of either switch 1 or switch 2 completes the circuit of the operating winding 3ᵃ of switch 3. For example, switch 1 completes circuit from conductor 35, by conductor 42, through auxiliary contacts 1ᵇ, by conductor 43 through contacts 5ᵇ of relay 5, by conductor 44 through auxiliary contacts 4ᵇ of high speed switch 4, by conductor 45 through winding 3ᵃ, by conductor 46 to conductor 38 and thence to line L³ as previously traced. On the other hand, switch 2 completes circuit from conductor 41 by conductor 47 through auxiliary contacts 2ᵇ, by conductor 48 to conductor 43 and thence through the contacts 5ᵇ of relay 5, auxiliary contacts 4ᵇ of switch 4, to and through winding 3ᵃ, as already traced. Thus switch 3 is rendered responsive upon closure of either switch 1 or switch 2 and upon responding starts the motor by primary winding P, at the same time closing the energizing circuit of device 7. This circuit may be traced from line L⁴ by conductors 50 and 51 through the winding 7ᵃ of said device, by conductor 52 through auxiliary contacts 3ᶜ of switch 3, by conductor 53 to line L³.

When device 7 responds it progressively excludes the resistances R and R' from the secondary circuit of the motor as above described, and furthermore completes the energizing circuit of relay 5, assuming prior movement of the master switch to one of its extreme positions, and further assuming closure of switch 1 or switch 2. With switch 1 closed, the circuit may be traced from line L⁴ through the master switch, by conductor 55 through auxiliary contacts 1ᶜ of switch 1, by conductors 56 and 57 through auxiliary contacts 7ᶠ of the device 7, by conductor 58 through the winding 5ᵃ of relay 5 to line L³. On the other hand, with switch 2 closed, circuit is traceable from line L⁴ through the master switch, by conductor 59 through auxiliary contacts 2ᶜ of switch 2, to conductor 56 and thence through auxiliary contacts 7ᶠ to and through the winding 5ᵃ, as described.

When relay 5 responds it interrupts the energizing circuit of switch 3, thereby releasing said switch for disconnecting the primary winding P from circuit and for de-energizing the accelerating device 7. Also, the relay in responding bridges its contacts 5ᵈ to establish a maintaining circuit for its operating winding independent of the device 7 and bridges its contacts 5ᵉ to complete the energizing circuit of switch 4 from line L⁴ through said contacts, by conductor 60 through auxiliary contacts 3ᵇ of switch 3, by conductor 61 through the winding 4ᵃ of said switch 4, by conductor 62 to conductor 38 and thence through resistance r, by conductors 39 and 40 to line L³. Thus by reason of the inclusion of the resistance r in the energizing circuit of switch 4, said switch cannot respond until the device 7 returns to initial position to re-insert all resistance in the secondary circuit of the motor and to short-circuit resistance $r$ by its auxiliary contacts $7^e$. When, however, the device 7 so acts, the switch 4 at once responds to connect in circuit the primary winding $P'$ and to re-establish the energizing circuit of the device through the medium of auxiliary contacts $4^c$ which parallel the auxiliary contacts $3^c$ of slow speed switch 3. Thereupon the device 7 again responds to accelerate the motor to the normal speed provided for by winding $P'$.

When the motor is operating at high speed in either direction return of the master switch to its first operative position interrupts the energizing circuit of relay 5 and said relay upon release interrupts the circuit of high speed switch 4 and re-establishes the energizing circuit of switch 3 but inclusive of resistance $r$ when the device 7 is in accelerating position. However, switch 4 upon release interrupts the energizing circuit of device 7 and said device upon reinserting the secondary resistance short-circuits the resistance $r$, permitting the switch 3 to respond. And switch 3 upon responding re-establishes the circuit of the slow speed primary winding P and furthermore re-establishes the energizing circuit of the device 7 for subsequent removal of the secondary resistance. Then if the master switch be returned to "off" position, assuming slow speed operation of the motor, it de-energizes the preselected reversing switch and brake relay 10 and the former thereupon de-energizes switch 3 and device 7 for stopping of the motor.

When, however, the master switch is thrown to "off" position with the motor exceeding slow synchronous speed by a predetermined degree, the fly ball governor switch 11 establishes a maintaining circuit for the preselected reversing switch independent of the master switch. This circuit may be traced from line $L^4$ by conductors 50 and 63 through said switch 11, by conductors 64 and 43 through the auxiliary contacts of the preselected reversing switch and through the winding of such reversing switch to conductor 36 and thence through the winding of brake relay 10 to line $L^3$. Accordingly so long as the switch 11 remains closed, the power connections of the slow speed primary winding are maintained, thereby causing self braking of the motor until its speed is reduced to a predetermined degree, whereupon the switch 11 opens to permit disconnection of the motor from circuit as previously described. In this connection it is to be noted that the brake relay 10 is also maintained energized so long as the switch 11 remains closed whereby the application of the brakes is delayed until the self braking action of the motor is terminated.

Finally considering the circuits of the brake operating windings, that of the brake 8 extends from line $L^4$ by conductors 50 and 65 through contacts $10^b$ of relay 10, by conductor 66 through the winding $8^a$, by conductor 67 through contacts $10^c$ of relay 10, by conductor 40 to line $L^3$. On the other hand, the circuit of the winding $9^a$ of brake 9 extends from conductor 65, by conductor 68 through said winding and a parallel resistance $r'$ to conductor 67 and thence to line $L^3$ as already traced.

Thus when the brake relay releases it interrupts the energizing circuits of both coils and further interrupts the loop containing said coils, thereby insuring immediate de-energization of coil $8^a$ and application of brake 8. Coil $9^a$, however, is permitted to discharge through the local circuit including resistance $r'$, thereby causing a temporary delay in the application of brake 9.

What I claim as new and desire to secure by Letters Patent, is:

1. In a controller for a motor having separate slow speed and high speed windings, in combination, means to connect such windings in circuit selectively and to insure connection of the slow speed winding prior to the connection of the high speed winding, and means to effect acceleration of the motor, said last-mentioned means including means whereby it acts until subjected to a predetermined accelerating operation to delay connection of the high speed winding.

2. In a controller for a motor having separate slow speed and high speed windings, in combination, means to connect said windings in circuit selectively and to insure connection of the slow speed winding prior to connection of the high speed winding, and means to effect acceleration of the motor, said last mentioned means including means whereby it acts until subjected to a predetermined accelerating operation to delay connection of the high speed winding, said accelerating means also acting to accelerate the motor upon connection of the high speed winding.

3. In a controller for an alternating current motor having separate slow speed and high speed primary windings to be connected in circuit selectively, in combination, selecting means for such windings insuring connection of the slow speed winding prior to connection of the high speed winding, and accelerating means for the motor acting upon the secondary circuit thereof, said last-mentioned means including means whereby it acts until subjected to a predetermined accelerating operation to delay connection of the high speed winding.

4. In a controller for an alternating current motor having separate slow and high speed primary windings to be connected in circuit selectively, in combination, selecting means for such windings insuring connection of the slow speed winding prior to connection of the high speed winding and accelerating means for the motor acting upon the secondary circuit thereof and rendering connection of the high speed winding dependent upon prior accelerating operation and resetting thereof.

5. In a controller for an electric motor having separate slow and high speed windings, in combination, electro-magnetic means for connecting the slow speed winding in circuit, automatic accelerating means for the motor responsive upon response of the former means and electro-responsive means to connect the high speed winding in circuit but only after full operation and resetting of said accelerating means, the resetting of said accelerating means being dependent upon de-energization of said first mentioned means.

6. In a controller for an electric motor having separate slow and high speed windings, in combination, electro-magnetic means for connecting the slow speed winding in circuit, automatic accelerating means for the motor responsive upon response of the former means, electro-responsive means to connect the high speed winding in circuit but only after full operation and resetting of said accelerating means, the resetting of said accelerating means being dependent upon de-energization of said first mentioned means, and means associated with said first and last mentioned means to insure against connection of the high speed winding until after connection of the slow speed winding.

7. In a controller for an electric motor having separate slow speed and high speed windings, in combination, an electro-responsive switch to connect the slow speed winding in circuit, an electro-responsive switch to connect the high speed winding in circuit, electro-responsive accelerating means for the motor responsive upon closure of the former switch, and an electro-responsive relay responsive to de-energize said former switch but only after response of said accelerating means and to energize the latter switch but only after de-energization of said former switch and said accelerating means.

8. In a controller for an electric motor having separate slow speed and high speed windings, in combination, an electro-responsive switch to connect the slow speed winding in circuit, an electro-responsive switch to connect the high speed winding in circuit, electro-responsive accelerating means for the motor responsive upon closure of the former switch, and an electro-responsive relay responsive to de-energize said former switch but only after response of said accelerating means and to energize the latter switch but only after de-energization of said former switch and said accelerating means, said latter switch upon responding being adapted to re-energize said accelerating means.

9. In a controller for an alternating current motor having separate slow and high speed primary windings, in combination, separate electro-responsive switches for connecting such windings in circuit, electro-responsive controlling means for the secondary circuit of the motor, said means being responsive upon closure of each of said switches and rendering response of each of said switches dependent upon neutral positioning thereof, an electro-responsive relay dependent for energization upon response of said accelerating means and requiring energization prior to connection of the high speed primary winding in circuit by its respective switch and manual means controlling said switches to determine the speed of the motor.

10. In a controller for an alternating current motor, having separate primary windings for the slow speed and high speed operation thereof, in combination, means to establish power connections for such windings selectively and to interrupt the power connections of both windings, a manual control device for said means and automatic means controlling the former means independently of said control device to insure establishment of power connections for the slow speed winding under certain speed conditions of the motor for self braking of the motor.

11. In a controller for an alternating current motor having separate slow speed and high speed primary windings, in combination, means to establish power connections for such windings selectively, automatic control means for the former means to effect establishment of power connections for the slow speed winding under predetermined motor conditions for self braking action of the motor and manual control means for said former means to effect disconnection of both primary windings but subject to delay by said second mentioned means.

12. In a controller for an alternating current motor having separate slow speed and high speed primary windings, of an electro-responsive switch to establish power connections for the slow speed winding, a separate electro-responsive switch to establish power connections for the high speed primary winding, a manual control device to energize said switches selectively and to de-energize both and automatic means to energize said first mentioned switch independently of said control means under predetermined motor conditions for effecting self braking action of the motor.

13. In a controller for an alternating current motor having separate slow speed and high speed primary windings, of an electro-responsive switch to establish power connections for the slow speed winding, a separate electro-responsive switch to establish power connections for the high speed primary winding, a manual control device to energize said switches selectively and to de-energize both and automatic means to energize said first mentioned switch independently of said control means under predetermined motor conditions for effecting self braking action of the motor, but said automatic means being dependent for such action upon de-energization of said second mentioned switch.

14. In a controller for an alternating current motor having separate slow speed and high speed primary windings, in combination, means to establish power connections for such windings selectively and to interrupt the power connections of both, automatic means for varying the resistance of the secondary circuit of the motor and control means for the aforesaid means adapted under predetermined motor conditions to effect establishment of the power connections of the slow speed winding for self braking action of the motor and operation of said resistance varying means for regulation of the braking action of the motor.

15. In a controller for an alternating current motor having separate slow speed and high speed primary windings, in combination, means for establishing power connections for such windings selectively, automatic resistance varying means for the secondary circuit of the motor, the latter means insuring a predetermined resistance of the secondary circuit of the motor upon establishment of power connections for the slow speed primary winding and for reduction of such resistance automatically thereafter, and means controlling said first mentioned means to effect establishment of power connections for the slow speed winding when the speed of the motor exceeds a predetermined value following disconnection of the high speed primary winding.

16. The combination with an electric motor having a primary member adapted to produce different numbers of poles and a secondary member having a resistor in circuit therewith, of a pair of switches for connecting said primary member to produce one or another of said numbers of poles, a transfer switch for rendering one of said pair of switches ineffective and the other of said pair of switches effective, a switch for short-circuiting said resistor and a switch mechanically connected to said short-circuiting switch for controlling said transfer switch.

17. The combination with an electric motor having a primary member adapted to produce different numbers of poles and a secondary member having a resistor in circuit therewith, of a pair of switches for connecting said primary member to produce one or another of said numbers of poles, a transfer switch for rendering one of said pair of switches ineffective and the other of said pair of switches effective, said transfer switch having an actuating coil, a switch for short-circuiting said resistor, a switch mechanically connected to said short-circuiting switch for closing the circuit of said coil and a switch for maintaining said first-named coil energized.

18. The combination with an electric motor having a primary member adapted to produce different numbers of poles and a secondary member having a resistor in circuit therewith, of a pair of switches for connecting said primary member to produce one or another of said numbers of poles. each having an actuating coil, a transfer switch having two operative positions in each of which it controls the circuit of one of said coils, said transfer switch normally occupying one of said positions and having an energizing coil for actuating it to said other position, a plurality of progressively actuated switches for short-circuiting said resistor, and a switch mechanically connected to the last of said progressively actuated switches to operate for closing the circuit of said transfer-switch coil.

In witness whereof, I have hereunto subscribed my name.

HARRISON P. REED.